United States Patent
Fischer et al.

(10) Patent No.: US 9,259,700 B2
(45) Date of Patent: Feb. 16, 2016

(54) DISPERSION MEDIUM COMPRISING MONOCARBOXYLIC ESTERS FOR PREPARATIONS OF SOLIDS

(75) Inventors: Martin Fischer, Wesel (DE); Wolfgang Pritschins, Wesel (DE); Frank Vennhoff, Alpen (DE); Lucia Spikker-Heilen, Alpen (DE); Andrea Esser, Wesel (DE)

(73) Assignee: BYK-Chemie GmbH (DE)

( * ) Notice: Subject to any disclaimer, the term of this patent is extended or adjusted under 35 U.S.C. 154(b) by 0 days.

(21) Appl. No.: 13/061,383

(22) PCT Filed: Sep. 1, 2009

(86) PCT No.: PCT/EP2009/006322
§ 371 (c)(1),
(2), (4) Date: May 25, 2011

(87) PCT Pub. No.: WO2010/025889
PCT Pub. Date: Mar. 11, 2010

(65) Prior Publication Data
US 2011/0313089 A1    Dec. 22, 2011

(30) Foreign Application Priority Data

Sep. 2, 2008  (DE) .......................... 10 2008 045 296

(51) Int. Cl.
| | | |
|---|---|---|
| *C08K 5/101* | (2006.01) | |
| *C08L 91/00* | (2006.01) | |
| *B01F 17/00* | (2006.01) | |
| *C09C 1/02* | (2006.01) | |
| *C09C 1/30* | (2006.01) | |
| *C09C 1/36* | (2006.01) | |
| *C09C 1/42* | (2006.01) | |
| *C09C 1/48* | (2006.01) | |
| *C09C 3/08* | (2006.01) | |
| *C09D 7/02* | (2006.01) | |
| *C09D 17/00* | (2006.01) | |

(52) U.S. Cl.
CPC ........... *B01F 17/0028* (2013.01); *B01F 17/005* (2013.01); *C09C 1/021* (2013.01); *C09C 1/3063* (2013.01); *C09C 1/3669* (2013.01); *C09C 1/42* (2013.01); *C09C 1/48* (2013.01); *C09C 3/08* (2013.01); *C09D 7/02* (2013.01); *C09D 17/00* (2013.01); *C01P 2006/22* (2013.01)
USPC ............ 106/244; 106/266; 106/311; 524/315

(58) Field of Classification Search
USPC ........... 524/315, 318, 127, 128; 106/244, 266
See application file for complete search history.

(56) References Cited

U.S. PATENT DOCUMENTS

| | | | | |
|---|---|---|---|---|
| 4,165,239 | A | * | 8/1979 | Linden et al. ................. 106/448 |
| 4,978,465 | A | * | 12/1990 | Sturwold ...................... 508/344 |
| 5,340,495 | A | * | 8/1994 | Mulcahy ................. B41N 3/06 |
| | | | | 106/243 |
| 5,348,678 | A | * | 9/1994 | Hodam et al. ................ 510/383 |
| 5,391,308 | A | * | 2/1995 | Despo ........................... 508/164 |
| 5,584,943 | A | * | 12/1996 | Banaszak et al. ............. 148/246 |
| 6,111,054 | A | | 8/2000 | Haubennestel et al. |
| 6,467,492 | B2 | * | 10/2002 | Hopkins et al. ............ 134/22.14 |
| 2004/0248744 | A1 | * | 12/2004 | King et al. .................... 508/437 |
| 2006/0096758 | A1 | * | 5/2006 | Berry ....................... C09K 8/40 |
| | | | | 166/291 |
| 2006/0234868 | A1 | | 10/2006 | Schnabel et al. |

FOREIGN PATENT DOCUMENTS

| | | | |
|---|---|---|---|
| DE | 27 28 237 | A1 | 1/1979 |
| DE | 103 14 520 | A1 | 8/2000 |
| DE | 10028411 | A1 | 2/2002 |
| DE | 10258856 | A1 | 7/2004 |
| DE | 102006048144 | A1 | 4/2008 |
| DE | 102006062439 | A1 | 7/2008 |
| DE | 102006062440 | A1 | 7/2008 |
| DE | 102006062441 | A1 | 7/2008 |
| DE | 102007005720 | A1 | 8/2008 |
| EP | 154678 | B1 | 8/1987 |
| EP | 417490 | B1 | 3/1991 |
| EP | 438836 | A1 | 7/1991 |
| EP | 270126 | B1 | 3/1994 |
| EP | 318999 | B1 | 3/1994 |
| EP | 0893155 | A2 | 1/1999 |
| EP | 879860 | B1 | 8/2002 |
| EP | 1081169 | B1 | 7/2003 |
| EP | 1486524 | A1 | 12/2003 |

(Continued)

OTHER PUBLICATIONS

"International Application No. PCT/EP2009/006322, International Search Report and Written Opinion issued Dec. 9, 2009", 17 pgs.

(Continued)

*Primary Examiner* — Tae H Yoon
(74) *Attorney, Agent, or Firm* — Schwegman Lundberg & Woessner, P.A.

(57) ABSTRACT

The invention concerns a composition comprising as component (A): 10% to 97% by weight, based on the total weight of the composition, of one or more monocarboxylic esters of the general formula $R^1$—CO—$OR^2$, in which $R^1$ is a saturated or unsaturated, branched or straight-chain, aliphatic group having 11 to 23 carbon atoms and $R^2$ is a branched or straight-chain aliphatic group, a cycloaliphatic group or aromatic group having 1 to 13 carbon atoms, and the sum of the carbon atoms of the groups $R^1$ and $R^2$ is not more than 30, the monocarboxylic ester or esters possessing a boiling point of more than 250° C. under a standard pressure of 101.3 kPa, and as component (B): 3% to 90% by weight, based on the total weight of the composition, of one or more dispersants, the composition possessing a viscosity at 25° C. of less than 5000 mPas. The invention further concerns the use of the composition as a dispersion medium, millbases obtained from the composition, and the use of the millbases.

12 Claims, No Drawings

(56) References Cited

FOREIGN PATENT DOCUMENTS

| EP | 893155 | B1 | 4/2004 |
|---|---|---|---|
| EP | 1416019 | A1 | 5/2004 |
| EP | 1640389 | A1 | 3/2006 |
| EP | 1650246 | A1 | 4/2006 |
| EP | 1593700 | B1 | 11/2006 |
| EP | 0790111 | B1 | 4/2007 |
| EP | 1596700 | B1 | 5/2007 |
| EP | 1803753 | A2 | 7/2007 |
| EP | 1837355 | A2 | 9/2007 |
| EP | 1742990 | B1 | 10/2007 |
| JP | 2008-143939 | A | 6/2008 |
| WO | WO-00/49099 | A1 | 8/2000 |

OTHER PUBLICATIONS

Nsib, F., et al., "Selection of dispersants for the dispersion of carbon black in organic medium", Progress in Organic Coatings, 55(4), (Apr. 1, 2006), 303-310.

* cited by examiner

DISPERSION MEDIUM COMPRISING MONOCARBOXYLIC ESTERS FOR PREPARATIONS OF SOLIDS

PRIORITY CLAIM TO RELATED APPLICATIONS

This application is a U.S. national stage application under 35 U.S.C. §371 of PCT/EP2009/006322, filed Sep. 1, 2009, and published as WO 2010/025889 A1 on Mar. 11, 2010, which claims priority to German Application No. 10 2008 045 296.3, filed Sep. 2, 2008, which applications and publication are incorporated herein by reference and made a part hereof in their entirety, and the benefit of priority of each of which is claimed herein.

The present invention relates to compositions which are suitable as a dispersion medium for preparations of solids, to millbases comprising the dispersion media, and to the further use of the millbases.

Dispersion media are used for producing fluid and easily handled preparations of particulate solids.

In order to be able to incorporate solids into liquid media, high mechanical forces are necessary. It is usual to use dispersants in order to lower the dispersing forces and in order to minimize the total input into the system of energy needed to deflocculate the particulate solids, and hence also to minimize the dispersing time. Dispersants of this kind are surface-active substances of anionic, cationic or neutral structure. These substances, in a small amount, are either applied directly to the solid or added to the dispersion medium. It is also known that, following complete deflocculation of the agglomerated solids into primary particles, after the dispersing operation, there are also instances of reagglomeration, thereby completely or partly nullifying the dispersing effort. As a consequence of the inadequate dispersing and/or as a result of reagglomeration, there are unwanted effects, such as viscosity increase in liquid systems, shade drift and losses of gloss in paint and coatings, and a reduction in mechanical strength in plastics.

Preparation of Solids (Concentrates) for Use in solvent-free media such as, for example, thermoplastics are produced in accordance with the prior art in general in plasticizers or low molecular mass polymers as vehicles. Plasticizers used are usually phthalates such as dibutyl phthalate, dioctyl phthalate, diisodecyl phthalate or adipates such as dioctyl adipate, diisononyl adipate or diisodecyl adipate.

The dispersion media known to date often represent only partial solutions to these problems. In view of the multiplicity of organic and inorganic pigments and filling materials that are nowadays used, sufficient stabilization of the particulate solids to be dispersed, by desorption-stable coating of the surface, is not sufficiently ensured. Consequently there are instances of agglomeration, since the efficient steric shielding necessary is absent. Moreover, the viscosities of the preparations of solids that can be produced in this way are very high, meaning that only low solids contents are possible and that handling is difficult.

It is an object of the present invention, therefore, to eliminate the above-described disadvantages of known dispersion media, in other words to develop dispersion media which, while affording effective stabilization of pigments or fillers, reduce the millbase viscosity of the preparations of solids to such an extent that processing is possible with a high degree of filling. At the same time, especially in the case of pigment pastes and filler pastes, it is necessary to ensure a broad compatibility, in order to allow these pastes to be used in many different binders and coating materials. It is necessary, furthermore, for the dispersing additives of the invention that are used to allow flocculation-free miscibility of the pastes, or of the binders or plastics compounds produced with these pastes, with one another. The preparations of solids that are produced therewith ought as far as possible to be free from volatile organic compounds (VOC) and ought not to contain any environmentally criticised plasticizers, especially phthalates, but ought instead as far as possible to be producible on the basis of renewable raw materials. By VOC here are meant organic compounds having an initial boiling point of not more 250° C. under a standard pressure of 101.3 kPa. The dispersion media ought to have easy handling properties, i.e. to be liquid and of low viscosity, and ought to enable easy processing for the user by virtue of as small as possible a number of inconvenient metering steps.

Surprisingly it has been found that a significant improvement can be achieved in the dispersing and stabilizing of pigments or filler particles in binders, pigment pastes or plastics formulations if the compositions of the invention that are described below are used.

Furthermore, the compatibility of these dispersion media is surprisingly wide, and they can be used in many solvent-free systems. They feature a low millbase viscosity in the course of dispersion, and therefore allow production of formulations with a high solids content. Furthermore, as a result of a finer dispersing procedure, the colour strengths of the pigment concentrates produced in accordance with the invention are generally significantly higher than those produced in accordance with the prior art, and so it is possible to achieve either a more intense coloration with the same amount of colour pigment, or to maintain the colouration while achieving a saving in terms of material and hence of cost.

It has surprisingly been found that the above objects have been achieved through the provision of compositions comprising as component (A) 10% to 97% by weight, based on the total weight of the composition, of one or more monocarboxylic esters of the general formula $R^1$—CO—$OR^2$, in which $R^1$ is a saturated or unsaturated, branched or straight-chain, aliphatic group having 11 to 23 carbon atoms and $R^2$ is a branched or straight-chain aliphatic group, a cycloaliphatic group or aromatic group having 1 to 13 carbon atoms, and the sum of the carbon atoms of the groups $R^1$ and $R^2$ is not more than 30, the monocarboxylic ester or esters possessing a boiling point of more than 250° C. under a standard pressure of 101.3 kPa, and as component (B) 3% to 90% by weight, based on the total weight of the composition, of one or more dispersants, the composition possessing a viscosity at 25° C. of less than 5000 mPas. The viscosity is determined using a Brookfield rotational viscometer (RVT rotational viscometer) at 20 revolutions per minute. The spindle is selected as a function of the viscosity such that the value to be read off is situated in the region of 10% to 90% of the measurement scale, and as close as possible to the 50% value of the measurement scale.

In one preferred embodiment the weight-percentage fraction of component (A) is at least 15%, preferably at least 25%, more preferably at least 50% and very preferably at least 75% by weight, based on the total weight of the composition. The maximum fraction is preferably 96% by weight, based on the total weight of the composition.

The weight-percentage fraction of component (B) in one preferred embodiment is at least 4% by weight, and more preferably at least 6% by weight, based on the total weight of the composition. The maximum fraction is preferably 75%, more preferably 50% and very preferably 25% by weight, based on the total weight of the composition.

The sum of the weight-percentage fractions of components (A) and (B) as a proportion of the total weight of the composition is preferably at least 50%, more preferably at least 70%, very preferably at least 90% and ideally at least 95% by weight.

Where the composition of the invention is not composed solely of components (A) and (B), it may further comprise one or more additives (C) that are typical of coating materials or plastics, that are different from (A) and (B), and that are preferably selected from the group consisting of flow control agents and film-forming additives, rheological additives, defoamers, adhesion promoters, light stabilizers, biocides, liquid or soluble stabilizers and catalysts. Where additives typical of coatings and/or plastics are to be present, the composition of the invention is composed of components (A), (B) and (C). The composition of the invention is commonly and preferably free from binders and VOC. Free from volatile organic compounds means, herein, that the composition contains less than 1% by weight of volatile organic compounds, preferably less than 0.1% by weight and very preferably less than 0.01% by weight.

In one preferred embodiment the composition is composed exclusively of component (A) and component (B).

The composition possesses a viscosity at 25° C., to be determined as specified above, of less than 5000 mPas, preferably less than 2000 mPas, more preferably less than 1000 mPas and very preferably less than 500 mPas. If the viscosity is 5000 mPas or more, adequate fluidity and pumpability are no longer ensured, particularly at relatively low temperatures, and only small quantities of solids can be incorporated.

The composition of the invention is outstandingly suitable as a dispersion medium. The term "dispersion medium" as used herein stands for a continuous, i.e. liquid, phase of a millbase which comprises solvents (corresponding herein to component (A)) and dispersants (corresponding herein to component (B)) and, if desired, further additives that are typical of millbases (corresponding herein to component (C)). In the dispersion medium it is possible to disperse or dissolve further millbase constituents such as, for example, binders, without such constituents being considered herein to belong to the dispersion medium. As such the composition of the invention constitutes a preferably clear, homogeneous solution which appears to the naked eye to be a continuous uniform liquid.

Since the compositions of the invention, composed of components (A), (B) and, if desired, (C), are already outstandingly suitable as they are as a dispersion medium, they preferably do not include any phthalates, though in principle are phthalate-compatible.

Component (A)

The monocarboxylic esters used as component (A) may originate from natural sources or may be obtained synthetically by esterification of fatty acids, preferably at elevated temperature and elevated pressure, or by chemical or enzymatic transesterification of glycerides such as, for example, triglycerides.

The corresponding monocarboxylic acids $R^1$—COOH are saturated or unsaturated, branched or straight-chain, aliphatic monocarboxylic acids having 12 to 24, preferably 12 to 18, more preferably 14 to 18 and very preferably 16 to 18 carbon atoms. Straight-chain monocarboxylic acids are preferred.

Suitable fatty acids are, for example, those derived by hydrolysis of sunflower oil, soybean oil, rapeseed oil, colza oil, linseed oil, talloil, nut oil, poppy oil, safflower oil, almond oil, castor oil, coconut oil, cottonseed oil, fish oil, fruit kernel oil, grape seed oil, hazelnut oil, tallow, hempseed oil, corn oil, mink oil, mustard oil, neatsfoot oil, olive oil, palm oil and palm kernel oil.

Suitable alcoholic esterification components ($R^2$—OH) are straight-chain or branched aliphatic, cycloaliphatic and/or aromatic monoalcohols having 1 to 13 carbon atoms, preferably not more than 8 carbon atoms, more preferably 4 carbon atoms. Examples of suitable monoalcohols are methanol, ethanol, propanol, butanol, ethylhexanol, decanol, lauryl alcohol, isotridecyl alcohol, monophenylglycol and benzyl alcohol. Preference is given to methanol, ethanol, propanol, butanol and 2-ethylhexanol, with methanol being particularly preferred.

Particular suitability is possessed for example by soya methyl ester, rapeseed oil methyl ester, methyl tallowate, methyl oleate, butyl stearate, butyl oleate, 2-ethylhexyl oleate, ethylhexyl palmitate, ethylhexyl stearate, ethylhexyl cocoate, isotridecyl stearate, particular suitability among these being possessed by soya methyl ester, rapeseed oil methyl ester and methyl tallowate, ethylhexyl cocoate.

Of the monocarboxylic esters which come under the general formula $R^1$—CO—O—$R^2$ (with the above-stated definitions of the radicals $R^1$ and $R^2$), the only compounds which can be used as component (A) in the compositions of the present invention are those which possess a boiling point under a standard pressure of 101.3 kPa of more than 250° C., preferably more than 280° C. and more preferably more than 300° C. Where the boiling point is 250° C. or below, these substances are considered as VOC.

Compounds of this kind usually represent commercial products, which frequently are not in a pure form but instead constitute mixtures of compounds of similar structure.

Component (B)

Component (B) comprises one or more dispersants, in other words surface-active substances, which facilitate the dispersing of a substance in powder or fibre form, a pigment or a filler for example, by lowering the interfacial tension between the powder or fibre substance and its surrounding medium. Dispersants facilitate the disruption of the secondary particles of the powder substances, present in the form of agglomerates, into primary particles, and inhibit reagglomeration. Where the dispersants are also suitable for wetting the particles, they are referred to as wetting agents and dispersants. These are therefore likewise embraced by the concept of the dispersant.

The dispersants are those which contain one or more groups X with pigment and/or filler affinity and which therefore bind covalently, ionically and/or by physisorption to the surface of the pigment or filler. Moreover, they effect stabilization of the primary pigment and filler particles and thus prevent agglomeration, which otherwise leads to the sedimentation of the solids and hence the separation of the millbase system or a colour concentrate. It is generally one or more groups Y in the dispersant that are responsible for this stabilization, ensuring compatibility with the surrounding medium.

As well as simple compounds of low molecular mass, such as lecithin, fatty acids and their salts and alkylphenol ethoxylates, for example, complex structures are also among the dispersants used.

Dispersants used are preferably dispersants of relatively high molecular mass, more particularly polymeric dispersants based on functional polymers, preferably having a number-average molecular mass ($M_n$) of at least 400 g/mol, preferably at least 800 g/mol, more preferably at least 2000 g/mol. The maximum molecular weight $M_n$ is usefully 100 000 g/mol, preferably 50 000 g/mol and more preferably 25 000 g/mol. The number-average molecular weights can be determined by means of gel permeation chromatography against a polystyrene standard.

More particularly the dispersant employed in accordance with the invention may be selected from the group of polymers and copolymers with functional groups and/or groups having pigment affinity, alkylammonium salts of polymers and copolymers, polymers and copolymers with acidic groups, comb and block copolymers, such as block copolymers having, in particular, basic groups with pigment affinity, unmodified or modified acrylate block copolymers, unmodified or modified polyurethanes, unmodified or modified and/or unsalified or salified polyamines, epoxide-amine adducts, phosphoric esters, especially of polyethers, polyesters and polyether-esters, basic or acidic ethoxylates such as alkoxylated monoamines or polyamines, or acidic 1,2-dicarboxylic anyhdride monoesters of alkoxylated monoalcohols, reaction products of unsaturated fatty acids with monoamines, diamines and polyamines, amino alcohols, and unsaturated 1,2-dicarboxylic acids and their anhydrides and salts thereof and reaction products with alcohols and/or amines; polymers and copolymers with fatty acid radicals, unmodified or modified polyacrylates, such as transesterified polyacrylates, unmodified or modified polyesters, such as acid-functional and/or amino-functional polyesters, polyphosphates and also mixtures thereof.

As dispersants it is preferred more particularly to select those compounds as are described in the publications EP 0 154 678 B1, EP 0 270 126 B1, EP 0 318 999 B1, EP 0 417 490 B1, EP 0 879 860 B1, EP 0 893 155 B1, EP 1081 169 B1, EP 1416 019 A1, EP 1486 524 A1, EP 1593 700 B1, EP 1640 389 A1, EP 1650 246 A1, EP 1742 990, EP 1803 753, EP 1837 355, DE 102006048144, DE 102006062439, DE 102006062440, DE 102006062441 and DE 102007005720, more preferably the dispersants claimed in EP 0 893 155 B1.

Polymeric dispersants based on polyisocyanates are described for example in EP 0 154 678, in EP 318 999 and in EP 0 438 836. These products are prepared by addition reaction of monohydroxy compounds, diisocyanate-functional compounds and compounds having a tertiary amino group with the extant NCO groups of polyisocyanates containing isocyanurate, biuret, urethane and/or allophanate groups.

In one preferred embodiment the dispersants used as component (B) are obtainable by salification of an amine-functional compound by means of an acid, the amine-functional compound being a polyamine having at least three amino groups, from the group consisting of "unmodified, aliphatic linear or branched polyamines from the following group: "diethylenetriamine, triethylenetetramine, tetraethylenepentamine, penta-ethylenehexamine, hexamethyleneheptamine, higher linear polymers of the general formula $NH_2$—$(C_2H_4NH)_n$—$C_2H_4$—$NH_2$ with n>5, it being possible in these compounds for protons on the nitrogen to have been replaced with alkyl, aryl and/or aralkyl groups, and/or for the nitrogen to be in quaternized form, branched $(C_2-C_4)$-alkylenamines and poly$(C_2-C_4)$alkylenimines having tertiary amino groups and a number-average molecular weight of up to 1 000 000 g/mol, or a mixture of such amines"; modified polyamines based on the aforementioned unmodified polyamines, these being polyamines reacted with monoisocyanates or polyisocyanates possessing v NCO groups, of which (v-1) NCO groups have been reacted beforehand with other reactants, polyamines reacted with epoxy-functional substances, polyamines reacted with cyclic carbonates, polyamines reacted by means of a Michael reaction with α,β-unsaturated compounds, alkylated and/or quaternized polyamines, and/or polyamines amidated with carboxylic acids, with the proviso that, following the modification, there are still three salifiable amino groups present per molecule, or a mixture of such polyamines and/or polyamines of the group: "homopolymers or copolymers of amine-functional (meth)acrylates or vinyl compounds, and also amine-functional homopolymers or copolymers whose amino group has been inserted by means of polymer-analogous reaction into the prefabricated polymer or generated on said polymer, or a mixture of such polyamines", the homopolymer or copolymer having a number-average molecular weight of up to 1 000 000 g/mol", and the acid used being a substance from the group of "phosphoric esters of the general formula: $(OH)_{3-n}PO(OR^a)_n$, with n=1 or 2, sulphonic acids of the general formula $HOSO_2R^b$, acidic sulphuric esters of the general formula $HOSO_3R^b$", where $R^a$ and $R^b$ are an alkyl, aryl or aralkyl radical having at least 5 C atoms and/or a radical of an oxalkylated alcohol having a number-average molecular weight between 100 and 5000 g/mol, and/or a radical with at least one carboxylic ester group and/or a urethane group having a number-average molecular weight between 100 and 5000 g/mol, or a mixture of such substances, where $R^a$ and $R^b$ are the same or different and, if desired, some of the hydrogen atoms in the aliphatic groups of the radicals $R^a$ and $R^b$ have been replaced by halogen atoms, and the acid, if appropriate, carries further functional groups whose behaviour on salification is inert; and per molecule at least one amino group is in salified form.

The following groups of dispersants display particularly good action in the dispersions of the invention: (a) phosphorus ester salts of amino-containing oligomers or polymers, such as, for example, phosphorus ester salts of optionally fatty acid-modified or alkoxylated (more particularly ethoxylated) polyamines, phosphorus ester salts of epoxide-polyamine adducts, phosphorus ester salts of amino-containing acrylate or methacrylate copolymers, and phosphorus ester salts of acrylate-polyamine adducts, (b) mono-esters or diesters of phosphoric acid, such as, for example, monoesters or diesters of phosphoric acid with alkyl, aryl, aralkyl or alkylaryl alkoxylates (e.g. phosphoric monoesters or diesters of nonylphenol ethoxylates, isotridecyl alcohol ethoxylates, alkylene oxide polyethers prepared starting from butanol), monoesters or diesters of phosphoric acid with polyesters (e.g. lactone polyesters, such as caprolactone polyesters or mixed caprolactone/valero-lactone polyesters), (c) acidic dicarboxylic monoesters, examples being acidic dicarboxylic monoesters (more particularly of succinic acid, maleic acid or phthalic acid) with alkyl, aryl, aralkyl or alkylaryl alkoxylates (e.g. nonylphenol ethoxylates, isotridecyl alcohol ethoxylates or alkylene oxide polyethers prepared starting from butanol), (d) poly-urethane-polyamine adducts, (e) polyalkoxylated mono-amines or diamines (e.g. ethoxylated oleylamine or alkoxylated ethylenediamine) and (f) reaction products of unsaturated fatty acids with monoamines, diamines and polyamines, amino alcohols, and unsaturated 1,2-dicarboxylic acids and their anhydrides and salts thereof and reaction products with alcohols and/or amines.

Dispersants of this kind are available as commercial products, for example, from the company BYK-Chemie from Wesel, under the commercial designations BYK-220 S, BYK-9076, BYK-9077, BYK-P 104, BYK-P 104 S, BYK-P 105, BYK-W 9010, BYK-W 920, BYK-W 935, BYK-W 940, BYK-W 960, BYK-W 965, BYK-W 966, BYK-W 975, BYK-W 980, BYK-W 990, BYK-W 995, BYK-W 996, BYKUMEN, LACTIMON, ANTI-TERRA-202, ANTI-TERRA-203, ANTI-TERRA-204, ANTI-TERRA-205, ANTI-TERRA-206, ANTI-TERRA-207, ANTI-TERRA-U 100, ANTI-TERRA-U 80, ANTI-TERRA-U, DISPERBYK, DISPERBYK-101, DISPERBYK-102, DISPERBYK-103, DISPERBYK-106, DISPERBYK-107, DISPERBYK-108, DISPERBYK-109, DISPERBYK-110, DISPERBYK-111, DISPERBYK-112, DISPERBYK-115, DISPERBYK-116, DISPERBYK-130, DISPERBYK-140, DISPERBYK-142, DISPERBYK-145, DISPERBYK-160, DISPERBYK-161, DISPERBYK-162, DISPERBYK-163, DISPERBYK-164, DISPERBYK-165, DISPERBYK-166, DISPERBYK-167, DISPERBYK-168, DISPERBYK-169, DISPERBYK-170, DISPERBYK-171, DISPERBYK-174, DISPERBYK-176, DISPERBYK-180, DISPERBYK-181, DISPERBYK-182, DISPERBYK-183, DISPERBYK-184, DISPERBYK-185, DISPERBYK-187, DISPERBYK-190, DISPERBYK-191, DISPERBYK-192, DISPERBYK-193, DISPERBYK-194, DISPERBYK-2000, DISPERBYK-2001, DISPERBYK-2009, DISPERBYK-2010, DISPERBYK-2020, DISPERBYK-2025, DISPERBYK-2050, DISPERBYK-2070, DISPERBYK-2090, DISPERBYK-2091, DISPERBYK-2095, DISPERBYK-2096, DISPERBYK-2150, DISPERBYK-2155, DISPERBYK-2163, DISPERBYK-2164, DISPERPLAST-1010, DISPERPLAST-1011, DISPERPLAST-1012, DISPERPLAST-1018, DISPERPLAST-I, DISPERPLAST-P. Where absence of VOC is desired, the aforementioned commercial products ought as far as possible to be used as in the form of solvent-free active substance, and where appropriate ought to be freed by means of distillation from volatile constituents, for example.

Preference is given to dispersion media which are prepared with mixtures of different dispersants, since these compositions are generally notable for particularly broad compatibility and wide spectrum of use in terms of the solids and polymers that can be used.

By varying the groups X with pigment and/or filler affinity, on the one hand, and the groups Y that produce compatibility with respect to the medium, on the other hand, and by varying the proportions thereof and/or the molecular weights thereof, it is possible to tailor the compatibility of the dispersants of the invention to any of a very wide variety of solvents, vehicles, binders, resins, solids and, where appropriate, further polymeric compounds which are present in coating materials and moulding materials in which the preparations according to the invention are employed.

For use in highly polar systems, the groups Y ought to include a sufficiently high fraction of polar groups such as polyethylene oxides, for example, in order to achieve a polarity which is sufficient for the particular field of use. This fraction of hydrophilic groups, however, ought also not to be too high, since in certain applications this entails an unwanted increase in the sensitivity to water.

In the case of use in apolar systems such as long-oil alkyd varnishes, PVC plastisols or polyolefins, there ought preferably to be a corresponding fraction of apolar groups, and, in the case of use in systems where a broad compatibility is important, such as pigment concentrates, for example, a balanced combination of polar and apolar groups is an advantage.

If the preparations are used, for example, in a polyurethane resin or in a paint whose binder is a polyurethane, it is useful to use dispersants which in their molecule also include urethane groups or similar groups which, as the skilled person is aware, are compatible with polyurethanes. The same applies correspondingly for polyacrylates, polyesters and alkyd resins, for example, and all other classes of polymer.

This also applies, correspondingly, to the groups which are of particular influence on the affinity of the addition compounds of the invention for the solids that are used and are to be dispersed.

The dispersants can be used alone or together with further auxiliaries that are customary in the art.

The dispersants are used generally in an amount of 0.5% to 100% by weight, based on the solid to be dispersed. For the dispersing of specific solids, however, higher amounts of the dispersants may also be necessary.

The amount of dispersant is essentially dependent on the surface area to be coated of the solid to be dispersed. Carbon black, for example, requires substantially greater quantities of dispersant than, for example, titanium dioxide.

The compositions of the invention can be used as a dispersion medium for dispersing any of a very wide variety of solids in powder or fibre form. Accordingly the present invention further provides for the use of the compositions of the invention as a dispersion medium for solids in powder and/or fibre form, more particularly pigments and fillers of such kinds. The amount of the composition of the invention that is to be used is guided by the amount of component (B) therein, i.e. of the dispersant, and by the surface area of the solid to be dispersed, as addressed above.

Examples of solids in powder or fibre form are more particularly organic and inorganic pigments which are used in paints, coating materials, moulding compositions or other plastics, and organic or inorganic fillers which are used to fill or reinforce paints, coating materials, moulding compositions or other plastics. A subgroup of such fillers are fibres of organic and/or inorganic type which are likewise used as fillers or reinforcing substances.

Examples of pigments are mono-, di-, tri- and poly-azo pigments, oxazine, dioxazine or thiazine pigments, diketopyrrolopyrroles, phthalocyanines and other metal complex pigments, indigoid pigments, diphenylmethane, triarylmethane, xanthene, acridine, quinacridone and methine pigments, anthraquinone, pyranthrone, perylene and other polycyclic carbonyl pigments, inorganic pigments based on carbon black, graphite, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides of nickel, titanium, zinc, manganese, cobalt, iron, chromium, antimony, magnesium, aluminium (for example nickel titanium yellow or chromium titanium yellow), magnetic pigments based on pure iron, iron oxides and chromium oxides or mixed oxides, metallic effect pigments such as aluminium bronzes, pearlescent pigments, and fluorescent and phosphorescent luminescent pigments.

Examples of fillers in powder or fibre form are, for example, those made of pulverous or fibrous particles of aluminium oxide, aluminium hydroxide, silicon dioxide, kieselguhr, siliceous earth, quartz, silica gel, talc, kaolin, mica, perlites, feldspar, finely ground slat, calcium sulphate, barium sulphate, calcium carbonate, calcite, dolomite, glass or carbon. Further examples of pigments or fillers are found for example in EP-A-0 270 126.

Furthermore, mineral fillers as well, such as calcium oxide, and also flame retardants such as magnesium hydroxide, for example, can be dispersed. Matting agents can likewise be dispersed and stabilized to outstanding effect.

Further examples of dispersible solids are stabilizers and blowing agents which for improved handling are to be converted into a liquid concentrate form, such as, for example, azodicarbonamide (ADC), an organic-chemical blowing agent for the production of foamed polymers, which finds principal use in the foaming of PVC plastisols, thermoplastics, such as unplasticized and plasticized PVC, polystyrene (PS), graft copolymers of acrylonitrile and styrene onto butadiene rubbers, also known as ABS polymers, polyethylene (PE), polypropylene (PP), ethylene-vinyl acetate (EVA) and natural and synthetic rubbers, such as styrene-butadiene rubber (SBR), ethylene-propylene-diene rubber (EPDM), nitrile butadiene rubber (NBR) and chloroprene rubber (CR).

The present invention further provides a millbase which is obtainable by dispersing one or more solids in powder and/or fibre form in the composition of the invention. This dispersing operation may take place in the presence of additional substances, such as binders, for example, in which case the binders are preferably dispersed, emulsified or dissolved, before or during the dispersing of the solid or solids, in the composition of the invention (i.e. the dispersion medium). Millbases obtained in this way are notable for high solids contents. Such millbases are preferably free of volatile organic compounds.

The millbases of the invention can be employed with preference in the production of paints and thermoplastics or thermosets. Examples of thermoplastics are polyolefins, acrylic resins, styrene polymers, polycarbonates, polyamides, polyesters, thermoplastic polyurethanes, polyethersulphones, polysulphones, vinylpolymers, such as polyvinyl chloride or mixtures thereof, with PVC plastisols being particularly suitable. Mixtures of the aforementioned thermoplastics can also be employed. Examples of suitable thermosets are unsaturated polyesters, epoxy resins and polyurethanes or mixtures thereof.

Accordingly the invention additionally provides for the use of the millbases of the invention for producing paints and thermoplastics or thermosets.

EXAMPLES

The invention is illustrated below with reference to examples. In the case of molecularly nonuniform substances, the stated molecular weights represent average values of the numerical average (which, moreover, unless otherwise noted, applies throughout the description). The number-average molecular weights $M_n$ can be determined by gel permeation chromatography against a polystyrene standard. Unless stated otherwise, parts and percentages are by weight.

Component (A)—Monocarboxylic Esters

The following examples make use as monocarboxylic esters of component (A) of rapeseed oil methyl ether (RME), soya methyl ester (SME), ethylhexyl cocoate (EHC) and methyl tallowate (MT). All of the aforementioned esters possess a boiling point of more than 300° C.

Component (B)—Dispersants

Where, in the dispersant examples below, as a result of the production process, there were still volatile solvents present, they were removed as far as possible by vacuum distillation prior to use in accordance with the invention, giving a residual volatiles content of below 1%. Table 1 lists the dispersants used in the use examples.

TABLE 1

| (B) | Physical composition |
|---|---|
| B1 | Phosphorus ester salt of a polyamine, Preparation Example 5 of EP 893155 |
| B2 | Phosphorus ester salt of a polyamine, Preparation Example 7 of EP 893155 |
| B3 | Phosphorus ester salt of a polyamine, Preparation Example 10 of EP 893155 |
| B4 | Phosphorus ester salt of a polyamine, Preparation Example 12 of EP 893155 |
| B5 | Phosphorus ester salt of a polyamine, Preparation Example 14 of EP 893155 |
| B6 | Phosphorus ester salt of a fatty acid-modified polyamine, Preparation Example 16 of EP 893155 |
| B7 | Phosphorus ester salt of a fatty acid-modified polyamine, Preparation Example 19 of EP 893155 |

TABLE 1-continued

| (B) | Physical composition |
|---|---|
| B8 | Phosphorus ester salt of an epoxid-polyamine adduct, Preparation Example 24 of EP 893155 |
| B9 | Phosphorus ester salt of an amino-containing acrylate copolymer, Preparation Example 25 of EP 893155 |
| B10 | Phosphorus ester salt of an ethoxylated polyamine, Preparation Example 26 of EP 893155 |
| B11 | Phosphorus ester salt of an acrylate-polyamine adduct, Preparation Example 28 of EP 893155 |
| B12 | Phosphorus ester salt of an epoxide/amine adduct, Preparation Example 6 of EP 1486524 |
| B13 | Fatty acid condensate of an epoxide/amine adduct, Preparation Example 11 of EP 1486524 |
| B14 | Phosphoric monoester of a nonylphenol ethoxylate with 5 EO (ethylene oxide units) |
| B15 | Phosphoric mono/diester of a nonylphenol ethoxylate with 10 EO |
| B16 | Phosphoric monoester of an isotridecyl alcohol ethoxylate with 10 EO |
| B17 | Phosphoric monoester of a PO polyether prepared starting from butanol, with $M_n$ of 700 (PO = propylene oxide) |
| B18 | Phosphoric monoester of a caprolactone polyester, Preparation Example 1 of EP 417490 |
| B19 | Phosphoric mono/diester of a caprolactone polyester, Preparation Example 2 of EP 417490 |
| B20 | Phosphoric monoester of a caprolactone polyester, Preparation Example 8 of EP 417490 |
| B21 | Phosphoric monoester of a caprolactone polyester, Preparation Example 12 of EP 417490 |
| B22 | Sunflower fatty acid maleinized with 1 mol of maleic anhydride per mole of fatty acid |
| B23 | Sunflower fatty acid maleinized with 1 mol of maleic anhydride per mole of fatty acid, additionally reacted with 1 mol of oleylamine |
| B24 | Ethoxylated oleylamine with 10 mol of EO |
| B25 | Ethoxylated oleylamine with 2 mol of EO |
| B26 | Ethylenediamine alkoxylated with 60 mol of PO and 30 mol of EO |
| B27 | Acidic succinic monoester of an isotridecyl alcohol ethoxylate with 10 EO |
| B28 | Acidic maleic monoester of a PO polyether prepared starting from butanol, with $M_n$ of 1100 |
| B29 | Acidic phthalic monoester of an nonylphenol ethoxylate with 7 EO |
| B30 | Polyurethane-polyamine adduct, Preparation Example 1 of EP 1593700 |
| B31 | Polyurethane-polyamine adduct, Preparation Example 14 of EP 1593700 |
| B32 | Polyurethane-polyamine adduct, Preparation Example 23 of EP 1593700 |

Inventive Compositions

The inventive compositions were obtained by simple mixing of components (A) and (B). Table 2 gives the compositions of component (A) and (B). The compositions are composed exclusively of components (A) and (B). The percentages are percent by weight, based on the total composition.

TABLE 2

| Example | Component (A) | Component (B) |
|---|---|---|
| Z1 | 90% RME | 10% B1 |
| Z2 | 95% SME | 5% B2 |
| Z3 | 80% EHC | 20% B3 |
| Z4 | 90% RME | 5% B4 + 5% B24 |
| Z5 | 85% EHC | 15% B5 |
| Z6 | 92% RME | 4% B6 + 4% B22 |
| Z7 | 91% SME | 3% B7 + 3% B18 + 3% B29 |
| Z8 | 92% MT | 3% B8 + 3% B17 + 2% B28 |
| Z9 | 93% SME | 3% B9 + 3% B26 |
| Z10 | 95% RME | 5% B10 + 2% B23 |
| Z11 | 92% SME | 5% B11 + 3% B27 |
| Z12 | 88% MT | 6% B12 + 4% B14 + 2% B25 |

TABLE 2-continued

| Example | Component (A) | Component (B) |
|---|---|---|
| Z13 | 90% RME | 5% B13 + 2% B15 + 3% B19 |
| Z14 | 92% RME | 3% B16 + 5% B30 |
| Z15 | 92% EHC | 3% B20 + 5% B31 |
| Z16 | 94% RME | 3% B21 + 3% B15 |
| Z17 | 93% SME | 7% B23 |
| Z18 | 93% RME | 3.5% B11 + 3.5% B26 |
| Z19 | 90% MT | 10% B29 |
| Z20 | 90% SME | 10% B32 |
| Z21 | 92% RME | 8% B27 |
| Z22 | 85% SME | 15% B30 |
| Z23 | 68% SME | 16% B11 + 16% B26 |
| Z24 | 30% SME | 35% B11 + 35% B26 |
| Z25 | 50% SME | 25% B11 + 25% B26 |

Key:
RME = rapeseed oil methyl ester, b.p. > 300° C.; VOC-free
SME = soya methyl ester, b.p. > 300° C.; VOC-free
EHC = ethylhexyl cocoate, b.p. > 300° C.; VOC-free
MT = methyl tallowate, b.p. > 300° C.; VOC-free All of the inventive compositions specified above possess a Brookfield viscosity of below 500 mPas. (25° C.) and are free of volatile organic compounds (VOC).

Use Examples

To assess the inventive dispersion media they were used to produce concentrates of different organic and inorganic solids, and compared with prior-art concentrates in phthalate plasticizer (DINP diisononyl phthalate, DIDP=diisodecyl phthalate) or in pure fatty acid methyl ester (SME=soya methyl ester). The solids used were titanium dioxide (e.g. Ti-Pure® R 900, rutile, from DuPont), carbon black (CI Black 7-77266, regular colour furnace black, e.g. special black 4 from Degussa) and ADC (azodicarbonamide, e.g. ADC Porofor® ADC/M-C1 from Lanxess).

Dispersing Conditions:

The titanium dioxide pastes and the ADC pastes were produced by 5-minute dispersing of the pigment in the dispersion medium at 8000 revolutions per minute by means of a dispersing apparatus (Dispermat FE from Getzmann).

The carbon black pastes were produced by means of 3 passages on a Bühler SDY triple-roll mill.

The respective weight ratios of dispersion medium and pigment are reported in Tables 3, 4 and 5.

Viscosity Measurement Conditions:

The viscosities of the pigment concentrates were measured using a Haake RS 1 viscometer after 24 hours at 23° C. (Z10 DIN, D (sec$^{-1}$): 400).

ADC Concentrates:

TABLE 3

| Example No. | Dispersion medium | % | Pigment % | Viscosity mPas | Separation* | Sediment* |
|---|---|---|---|---|---|---|
| 1 | DINP** | 60 | 40 | 905 | little | yes |
| 2 | SME** | 60 | 40 | 150 | much | yes |
| 3 | DINP** | 40 | 60 | not preparable | | |
| 4 | SME** | 40 | 60 | not preparable | | |
| 5 | Z17 | 35 | 65 | 1405 | very little | no |
| 6 | Z18 | 35 | 65 | 1145 | very little | little |
| 7 | Z17 | 30 | 70 | 2390 | very little | no |
| 8 | Z18 | 30 | 70 | 2351 | very little | little |
| 9 | Z19 | 40 | 60 | 1181 | no | no |
| 10 | Z20 | 30 | 70 | 2359 | no | no |

*appearance after 5 days' storage
**not inventive

As can be seen from Table 3, the inventive examples, even after 5-day storage, show little or no propensity to form sediment or towards separation of the system. Inventive millbases with a pigment content of 60% by weight or more can be obtained and exhibit good processing viscosities, whereas the concentrates of the noninventive Examples 3 and 4 can no longer be processed at a weight fraction of 60% by weight of pigment. The concentrates of noninventive Examples 1 and 2, which can be prepared, do not, in contrast, possess stability on storage.

Titanium Dioxide Concentrates:

TABLE 4

| Example No. | Dispersion medium | % | Pigment % | Viscosity mPas | Separation* | Sediment* |
|---|---|---|---|---|---|---|
| 11 | DINP** | 60 | 40 | 1698 | little | yes |
| 12 | DINP** | 40 | 60 | not preparable | | |
| 13 | Z21 | 20 | 80 | 580 | very little | no |
| 14 | Z17 | 20 | 80 | 1844 | no | no |
| 15 | Z16 | 35 | 65 | 1780 | no | no |

*appearance after 5 days' storage
**not inventive

In Table 4 a comparison of inventive Examples 14 and 15 with the noninventive Example 11 shows that, for a similar viscosity, it is possible to achieve significantly higher levels of pigment in the concentrate. Furthermore, the concentrates of inventive Examples 14 and 15, in contrast to Example 11, are stable on storage, i.e. they exhibit neither separation nor sediment after 5-day storage. Example 13 shows particularly forcefully that, despite an extremely high pigment content (80% by weight), it is possible to achieve viscosities which lie well below the viscosities of the comparative experiments.

Carbon Black Concentrates:

TABLE 5

| Example No. | Dispersion medium | % | Pigment % | Viscosity mPas | Separation* | Sediment* |
|---|---|---|---|---|---|---|
| 16 | DIDP** | 80 | 20 | 1179 | no | no |
| 17 | DINP** | 65 | 35 | not preparable | | |
| 18 | Z18 | 65 | 35 | 488 | no | no |
| 19 | Z22 | 65 | 35 | 418 | no | no |
| 20 | Z23 | 60 | 40 | 872 | no | no |
| 21 | Z24 | 60 | 40 | 4173 | no | no |
| 22 | Z25 | 60 | 40 | 2277 | no | no |

*appearance after 5 days' storage
**not inventive,
DIDP = diisodecyl phthalate

From Table 5 it is evident that in conventional dispersion media (DIDP, DINP) it is possible to incorporate only relatively small amounts of carbon black. The millbases of the invention (concentrates) comprise a far higher fraction of carbon black, with viscosities that are outstanding to good.

What is claimed is:

1. A millbase obtained by dispersing one or more solids in powder and/or fibre form in a dispersion medium, wherein the dispersion medium is a composition comprising as component (A): 10% to 97% by weight, based on the total weight of the composition, of one or more monocarboxylic esters of the general formula $R^1$—CO—$OR^2$, in which $R^1$ is a saturated or unsaturated, branched or straight-chain, aliphatic group having 11 to 23 carbon atoms and $R^2$ is a branched or straight-chain aliphatic group, a cycloaliphatic group or aromatic group having 1 to 13 carbon atoms, and the sum of the carbon atoms of the groups $R^1$ and $R^2$ is not more than 30, the monocarboxylic ester or esters possessing a boiling point of more than 250° C. under a standard pressure of 101.3 kPa, and as component (B): 3% to 90% by weight, based on the total weight of the composition, of one or more dispersants, the composition possessing a viscosity at 25° C. of less than 5000 mPas.

2. The millbase of claim 1, wherein, based on the total weight of the composition, the sum of the weight fractions of component (A) and component (B) is at least 70% by weight.

3. The millbase of claim 2, wherein, based on the total weight of the composition, the sum of the weight fractions of component (A) and component (B) is at least 90% by weight.

4. The millbase of claim 1, wherein at least 75% by weight of component (A) and not more than 25% by weight of component (B).

5. The millbase of claim 1, wherein the composition has a viscosity at 25° C. of less than 500 mPas.

6. The millbase of claim 1, wherein the monocarboxylic esters possess a boiling point of more than 280° C.

7. The millbase of claim 1, wherein $R^1$—CO—O corresponds to a straight-chain aliphatic monocarboxylic acid $R^1$—CO—OH which contains 14 to 18 carbon atoms, and/or $R^2$ corresponds to an alcoholic esterification component $R^2$—OH which contains not more than 8 carbon atoms.

8. The millbase of claim 1, wherein component (B) comprises one or more of the compounds selected from the group consisting of (a) phosphorus ester salts of amino-containing oligomers or polymers, (b) monoesters or diesters of phosphoric acid, (c) acidic dicarboxylic monoesters, (d) polyurethane-polyamine adducts, (e) polyalkoxylated monoamines or diamines, and (f) reaction products of unsaturated fatty acids with monoamines, diamines and polyamines, amino alcohols, and unsaturated 1,2-dicarboxylic acids and their anhydrides and salts thereof and reaction products with alcohols and/or amines.

9. The millbase of claim 1, further comprising component (C) and component (C) is composed of one or more additives selected from the group consisting of flow control agents, film-forming additives, rheological additives, defoamers, adhesion promoters, light stabilizers, biocides, liquid or soluble stabilizers and catalysts.

10. The millbase of claim 1, wherein the solid in powder form is selected from the group consisting of pigments, fillers, matting agents, flame retardants and blowing agents.

11. The millbase of claim 1, wherein the solid in fiber form is elected from the group consisting of pigments, fillers, matting agents, flame retardants and blowing agents.

12. A millbase comprising:
(1) a dispersion medium, wherein the dispersion medium comprises: (A): 10% to 97% by weight, based on the total weight of the composition, of one or more monocarboxylic esters of the general formula $R^1$—CO—$OR^2$, in which $R^1$ is a saturated or unsaturated, branched or straight-chain, aliphatic group having 11 to 23 carbon atoms and $R^2$ is a branched or straight-chain aliphatic group, a cycloaliphatic group or aromatic group having 1 to 13 carbon atoms, and the sum of the carbon atoms of the groups $R^1$ and $R^2$ is not more than 30, the monocarboxylic ester or esters possessing a boiling point of more than 250° C. under a standard pressure of 101.3 kPa; and (B): 3% to 90% by weight, based on the total weight of the composition, of one or more dispersants, the composition possessing a viscosity at 25° C. of less than 5000 mPas; and
(2) one or more solids in powder and/or fibre form;
wherein the millbase is obtained by dispersing the one or more solids in powder and/or fiber form in the dispersion medium.

* * * * *